United States Patent [19] [11] 3,808,603
Degreve et al. [45] Apr. 30, 1974

[54] METHOD AND APPARATUS FOR LOADING AND UNLOADING A FACSIMILE SYSTEM

[75] Inventors: Charles E. Degreve, New Haven; Ernest J. Okleshen, Fort Wayne, both of Ind.

[73] Assignee: Minnesota Mining and Manufacturing Company St. Paul, Minn.

[22] Filed: Dec. 29, 1972

[21] Appl. No.: 319,344

[52] U.S. Cl. ................. 346/138, 346/103, 346/125, 346/134, 346/137, 346/146
[51] Int. Cl. ........................................... G01d 15/28
[58] Field of Search ...... 346/138, 103, 125; 11/137, 11/134

[56] References Cited

UNITED STATES PATENTS

| | | | |
|---|---|---|---|
| 3,654,624 | 4/1972 | Becker | 346/138 |
| 3,618,123 | 11/1971 | Buddendeck | 346/138 |
| 2,701,177 | 2/1955 | Rennes | 346/103 |

*Primary Examiner*—Richard B. Wilkinson
*Assistant Examiner*—Vit W. Miska
*Attorney, Agent, or Firm*—Alexander, Sell, Steldt & DeLaHunt

[57] ABSTRACT

The disclosure describes a method and apparatus for automatically loading and unloading a facsimile system comprising a releasable clamp for holding a document to a rotatable drum and also comprising drive circuitry for rotating the drum at an operating speed in a forward direction.

In order to unload the document, the apparatus rotates the drum in a reverse direction at a positioning speed less than the operating speed, so that the document is automatically fed from an opening in the facsimile system. When the clamped end of the document is adjacent the opening, the document is unclamped for convenient removal.

In order to load the document, the clamp is rotated to a position adjacent the opening, so that the document may be conveniently inserted in the clamp. The clamp is then closed and the drum is rotated in the forward direction at the positioning speed so that the document is automatically fed into the facsimile system.

10 Claims, 9 Drawing Figures

METHOD AND APPARATUS FOR LOADING AND UNLOADING A FACSIMILE SYSTEM

BACKGROUND OF THE INVENTION

1. Field of the Invention

This invention relates to facsimile systems and more specifically relates to apparatus and methods for loading and unloading a document in a facsimile system.

2. Description of the Prior Art

Although existing facsimile machines employ some means of loading and unloading a document, each of them has a common disadvantage of requiring some mechanical manipulation of the facsimile mechanism by an operator to effect these modes of operation.

In one type of currently-marketed facsimile machine having this deficiency, an operator lifts open a door above a drum which carries the document and then prepositions the drum by moving it with his fingers. After inserting the document into a clamp located on the drum, the operator must then close the door. At this point in the unit operation, the document is not wrapped around the drum, but is held only along one edge with a major portion of the document protruding from the front of the machine. In order to feed the document into the machine, the drum is rapidly rotated at its normal operating speed. If there is a slight misalignment of the paper in the clamp, the rapid drum velocity can easily cause the paper to become unclamped, thereby exposing the document to damage and necessitating a repetition of the loading cycle.

Accordingly, it is one object of the present invention to provide a facsimile system in which a document is loaded and unloaded at a positioning speed slower than the normal operating speed at which data is transmitted.

In another existing facsimile system, the drum is mechanically positioned by means of a protruding finger which stops the drum at a particular position whenever data is not being received or transmitted. To load a document into the machine, the operator pulls out a large drawer which exposes a flat area on which the document can be placed. At the same time, the drum is mechanically rotated to its load position. After positioning the document on the flat area, the operator pushes the drawer back into the unit, thereby causing the document to be wrapped around the drum. The document is unloaded by reversing this procedure.

In another drawer-loading facsimile system, the initial positioning of the drum is done electrically by means of a light source and photo cell, after which the operator manipulates a drawer-like device in order to load or unload a document.

Accordingly, it is another object of the present invention to automatically position a drum of a facsimile machine at a loading location and to automatically feed documents into and out of the machine without requiring mechanical manipulation by the operator.

In order to load another currently-marketed facsimile machine, a document is placed information-side down on a loading shelf and is manually moved toward a scanning drum until it trips a microswitch which, in turn, initiates the rotation of a loading belt. The loading belt carries the document around a stationary drum to a scanning position at which the belt is deactivated. After the document is scanned, the belt is again activated and the document is carried by the belt through an ejection opening in the machine. Because manual movement of the document is required until the microswitch is tripped and the document is carried by the loading belt, variations in the manual entry speed cause variations in the final resting position of the document around the drum. For example, if the operator is not careful, the document stops before it is drawn into the proper position. In this case, the document must be ejected and the entire loading process must be repeated. Examples of facsimile machines commercially available include the model 400 telecopier manufactured by Xerox Corporation, the "DEX" machine manufactured by Graphic Sciences, Inc., the facsimile machine manufactured by Shintron, Inc. and the 3-M VRC 600 remote copier manufactured by Matsushita Communications Systems, Inc.

Accordingly, it is another object of the present invention to provide a facsimile system in which a document is loaded by automatically energizing a paper clamping mechanism and by electrically rotating a drum in a forward direction at a relatively slow rate of speed.

Another object of the invention is to provide a means of automatically feeding a major portion of a document out of a facsimile system by electrically rotating a drum in a reverse direction at a relatively slow rate of speed and by automatically stopping the drum and unclamping the document at a location in which the document is easily accessible to an operator.

It is further object of the present invention to provide a unique logical sequencing of operations, including delays at appropriate points in the sequence, in order to provide a convenient and fool-proof means of loading and unloading a document in a facsimile system.

Yet another object of the present invention is to provide a unique logical mode of operation which eliminates the possibility of loading and unloading errors caused by improper operator actuation of the facsimile system.

Another object of the present invention is to provide initial condition circuitry which guarantees that the facsimile system will not create improper logic conditions resulting in paper loading or unloading malfunctions.

SUMMARY OF THE INVENTION

In order to achieve the foregoing objects and advantages and in order to overcome the deficiencies of the prior art, the applicants have developed unique techniques which enable a facsimile system to be automatically loaded and unloaded in a fool-proof and convenient manner. The present invention is preferably used in connection with a frame supporting a rotatable member, such as a drum, for carrying a document, releasable clamping means for holding the document to the rotatable member, and drive means for rotating the rotatable member at an operating speed in the forward direction. The frame of the system generally includes a document opening through which a document is loaded or unloaded.

When used with such apparatus, a principal feature of the present invention comprises the use of a speed control means operatively connected to the drive means for rotating the rotatable member at a positioning speed less than the operating speed. Selection means are also employed for producing a load signal and for producing an unload signal in response to actuation by an operator of the facsimile system.

If the operator actuates the selection means in order to unload a document, unloading means enable the drive means to rotate the rotatable member in the reverse direction so that the free end of the document is automatically fed from the facsimile system. When the clamped end of the document is rotated adjacent the document opening, positioning means produce a position signal that enables drive clamp means to release the clamping means so that the document is freed for unloading. By employing this unique technique, a document may be automatically unloaded at a safe speed which assures positive control and reliability.

In order to load a document, position logic means disables the drive means in response to a position signal generated by positioning means located on the drum and frame of the system so that the clamping means stops at a load location adjacent the document opening. This feature eliminates the need for any operator manipulation of the equipment during the loading process. As soon as the operator positions one end of the document in the clamping means and actuates the selection means, the document is automatically clamped and the rotatable member is rotated in the forward direction at the positioning speed, thereby providing automatic document loading in a convenient and foolproof manner. By using the foregoing techniques, a document may be loaded and unloaded in a facsimile system with a degree of accuracy and ease heretofore unattainable.

According to another feature of the invention, the selection means are designed so that documents can be loaded and unloaded by activating only a single switch.

According to still another feature of the invention the loading and unloading means are designed so that the rotatable member comes to a stop after one rotation during the loading and unloading cycles of operation.

DESCRIPTION OF THE DRAWINGS

These and other advantages and features of the present invention will hereafter appear in connection with the accompanying drawings in which like numbers refer to like parts throughout, and in which.

DESCRIPTION OF THE PREFERRED EMBODIMENT

Figure 1:
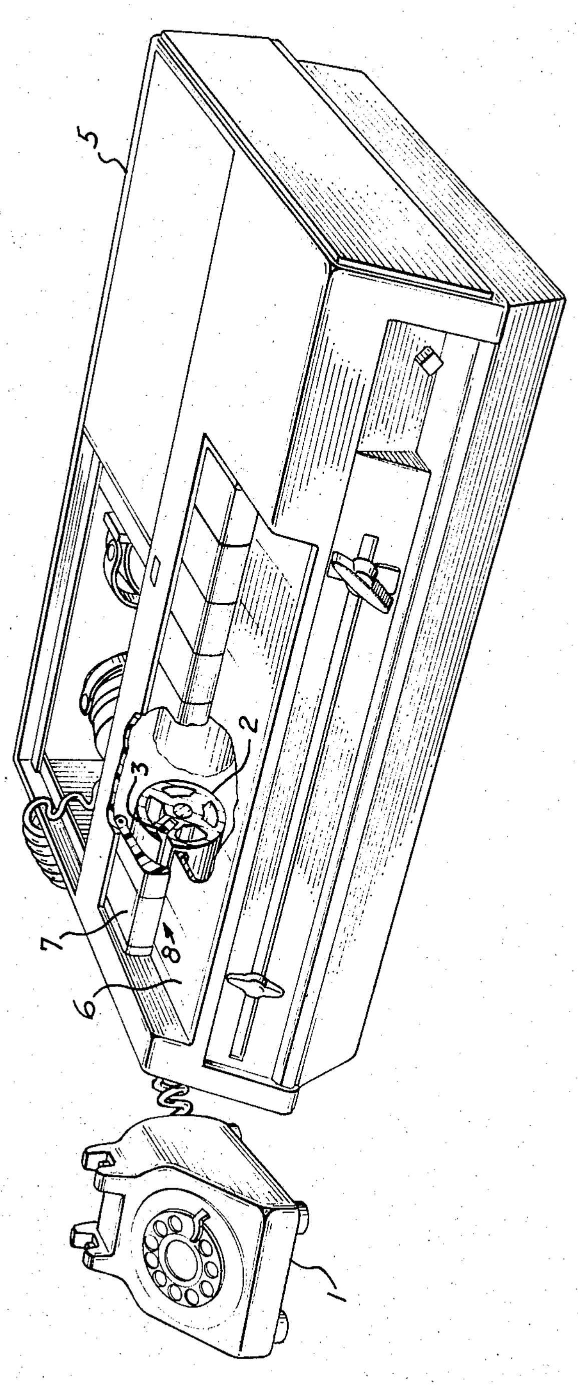
FIG. 1 is an isometric view of a preferred form of facsimile system made in accordance with the present invention.

Referring to FIG. 1, a preferred form of facsimile system made in accordance with the present invention and capable of transmitting data over a conventional telephone 1 would comprise a rotatable drum 2 capable of carrying a document. The drum is fitted with a paper clamping device 3 that clamps one end of the document to the drum in response to an electrical signal. One suitable paper clamping device is described in the copending application of Jan M. Farlow entitled "Mechanical Drum-Positioning and Paper-Clamping Mechanism For Facsimile." The drum is supported on a frame 4 (FIG. 4) which also supports a case 5. The case comprises an access door 7 and a loading shelf 6 which supports a document as it is being loaded or unloaded in the system. The lower edge of the access door and the upper surface of loading shelf define a document opening 8 through which a document is fed during the loading and unloading processes.

Figure 2:
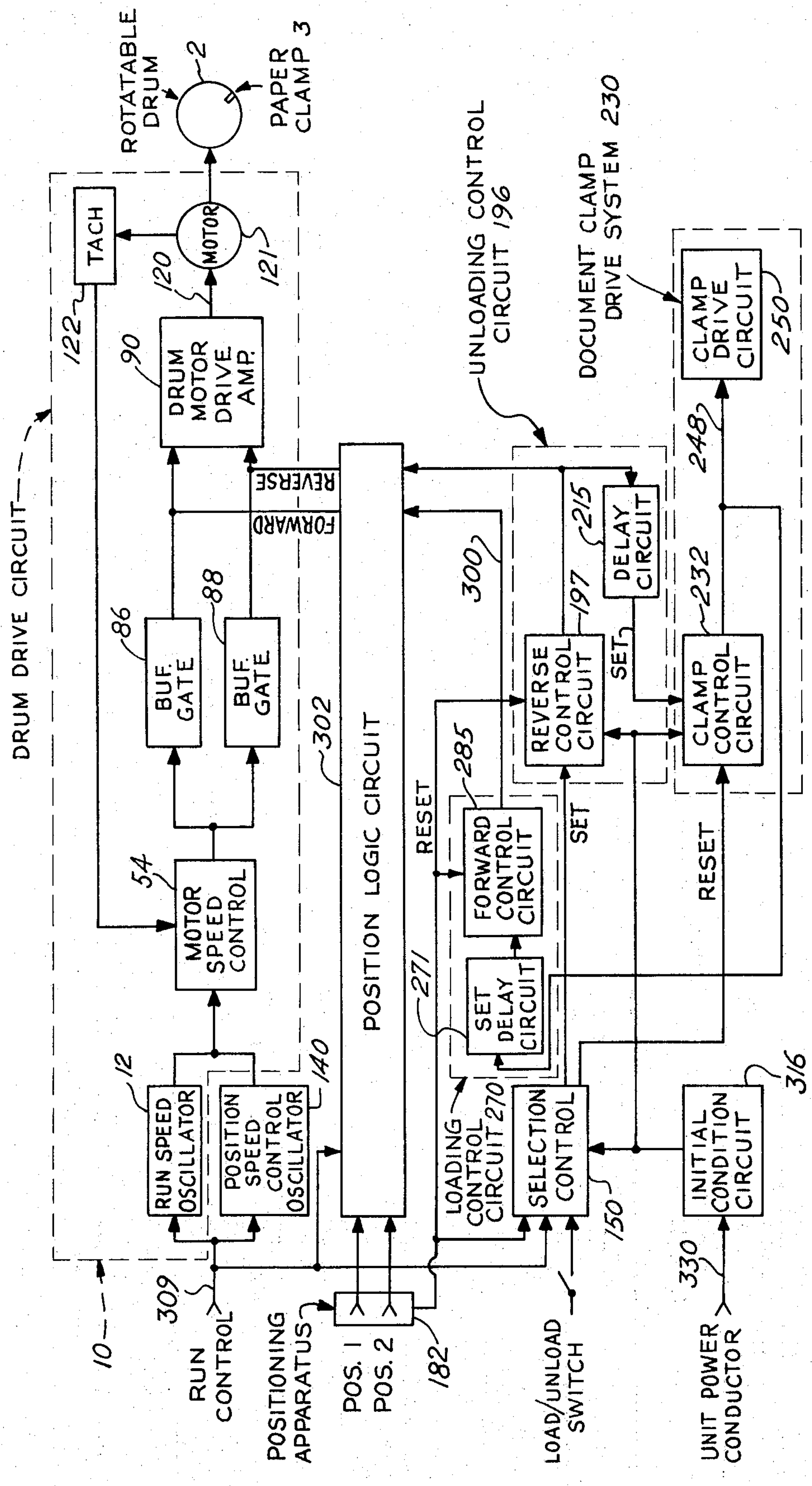
FIG. 2 is a block diagram schematic drawing of a preferred form of apparatus made in accordance with the present invention.

Referring to FIG. 2, an exemplary drum drive circuit 10 for rotating drum 2 comprises a run speed oscillator 12, a motor speed control circuit 54, buffer NAND gates 86 and 88, a drum motor drive amplifier 90, a DC drum drive motor 121 and a tachometer 122.

Figures 3, 3A:
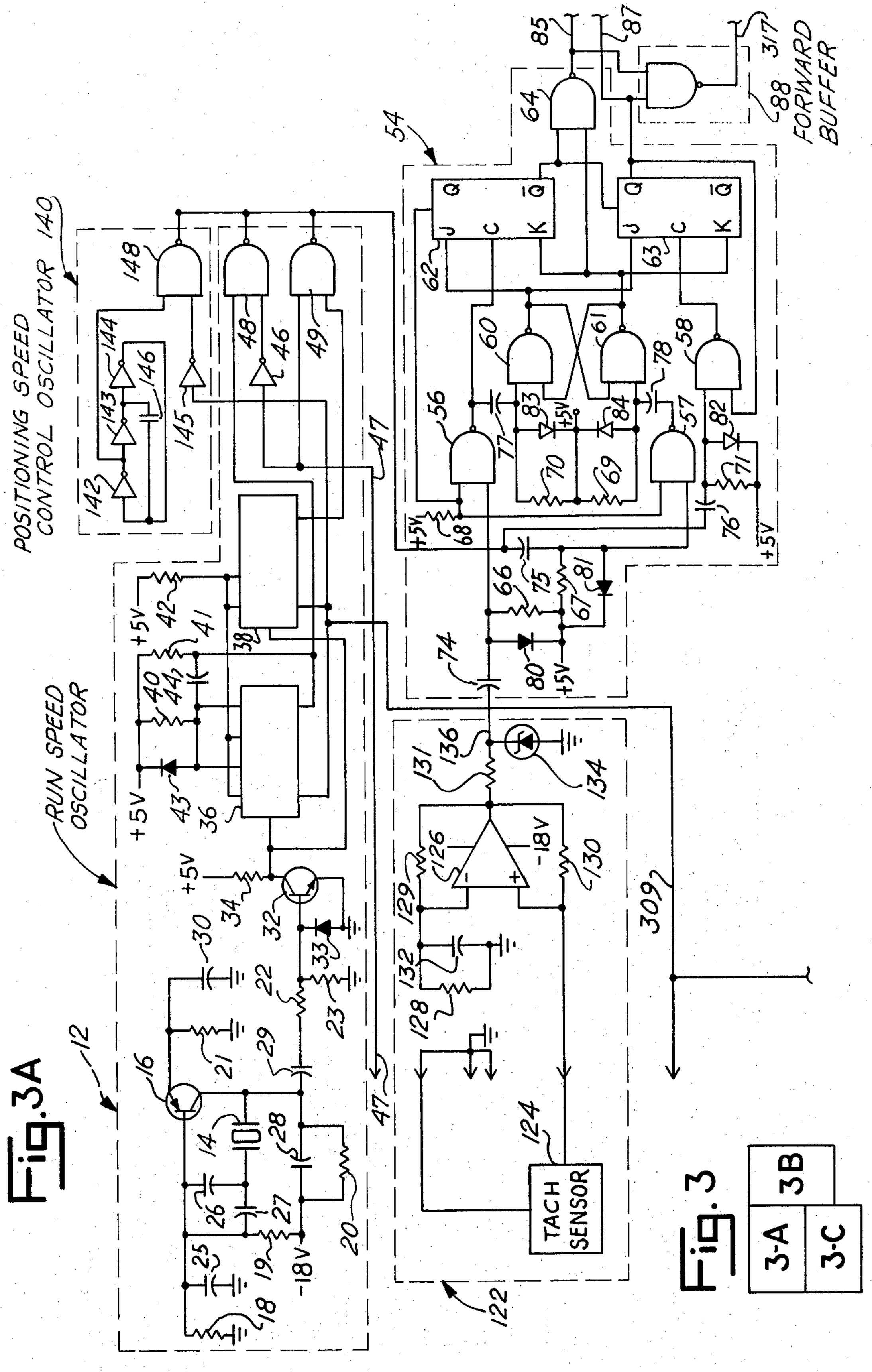
FIG. 3 illustrates that manner in which FIGS. 3A–3C should be arranged.
FIGS. 3A–3C are detailed electrical schematic drawings of the apparatus shown in FIG. 2.

Referring to FIG. 3A, run speed oscillator 12 comprises a crystal 14 that provides an input to a transistor 16 that is controlled by resistors 18–23 and capacitors 25–30. The oscillator also comprises an amplifying transistor 32 that is controlled by a diode 33 and a resistor 34. The output of transistor 32 is connected to a divide-by-6 circuit 36 and a divide-by-4 circuit 38 that are biased by resistors 40–42 and are further controlled by a diode 43 and a capacitor 44. Circuits 36 and 38 may comprise conventional binary flip-flop circuits. The output of the oscillator is gated through an inverter 46 and NAND gates 48, 49. Additional circuitry not shown and not relevant to the present invention controls the logic state of a conductor 47 so that the run speed oscillator produces an output signal having a frequency appropriate for the receipt of facsimile data in either a 3 or 6 minute mode of operation.

Motor speed control circuit 54 comprises NAND gates 56–58 and a flip-flop comprising NAND gates 60, 61. Circuit 54 also includes J–K flip-flops 62, 63 and an output NAND gate 64. In addition, the circuit is controlled by resistors 66–71, capacitors 74–78, and diodes 80–84.

Figure 3B:
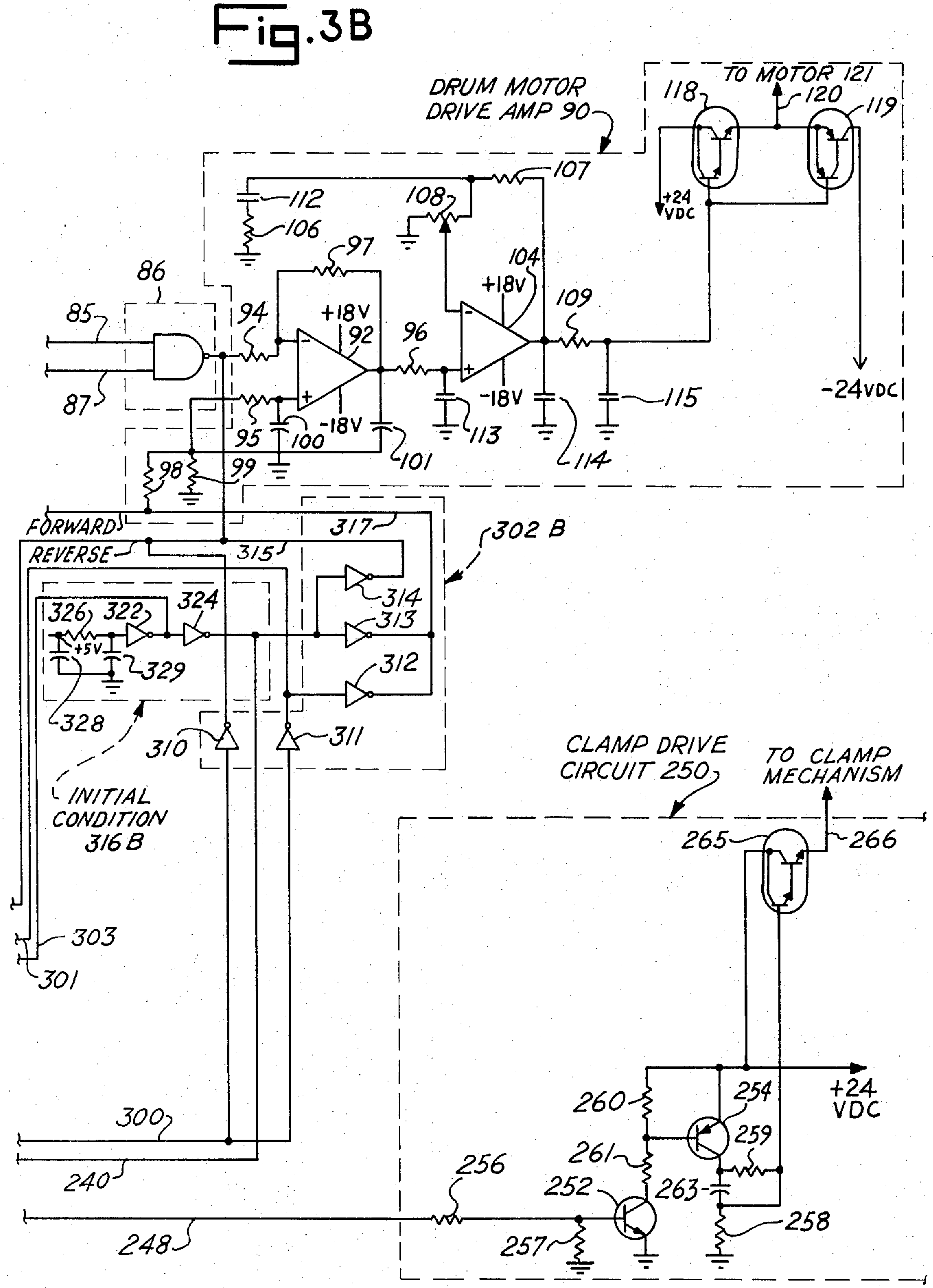

Referring to FIG. 3B, drum motor drive amplifier 90 comprises an operational amplifier 92 including resistors 94–97 and capacitors 100–101. The amplifier also comprises an additional amplifying circuit 104 controlled by resistors 106–109 and capacitors 112–115. The output of circuit 90 is driven by a Darlington pair of amplifiers 118, 119 that control DC motor 121 through a conductor 120.

Referring to FIG. 3A, tachometer 122 comprises a tachometer sensor 124 and an amplifier 126 that is controlled by resistors 128–131, a capacitor 132 and a Zener diode 134. The pulses produced by the tachometer are connected to the motor speed control over a conductor 136. In operation, the undesired speed variations of motor 121 and drum 2 are sensed by tachometer 122 which is mechanically coupled to the drum. The tachometer produces an AC output signal having a frequency determined by, and directly proportional to, the speed of the drum. For example, as the drum speed increases, the frequency of the AC signal produced on conductor 136 also increases. Motor speed control 54 receives the AC signal from tachometer 122 and also receives an input signal from run speed oscillator 12. Speed control 54 compares the frequency and phase of the tachometer signal with the oscillator signal and supplies an effective DC output signal having a level which is the function of the frequency and phase comparison of the two input signals. The output signal of speed control 54 is a series of pulses having variable widths, such that an increase in pulse width increases the effective DC level supplied to drum motor drive amplifier 90.

The output signal of the speed control 54 is supplied to amplifier 90 through buffer NAND gates 86 and 88 which function, in part, to provide isolation of drive amplifier 90 and speed control 54. Amplifier 90 amplifies its input signal to a sufficient level to drive DC motor 121.

During normal scanning or printing of a document, with the drum rotating at its desired operating speed, the frequency of the tachometer output signal equals the frequency of the run speed oscillator. Under this set of conditions, the output of speed control 54 is at a level which causes the motor to continue rotation of the drum at the operating speed. However, if the speed of the drum decreases somewhat, the phase of the tachometer output signal lags the phase of the oscillator output signal. Speed control 54 detects this difference in phase and increases the effective DC output level so that DC motor 121 increases the rotational speed of the drum. In the same manner, if the speed of the drum increases, the phase of the tachometer output signal leads the phase of the oscillator output signal. Speed control 54 then decreases the effective DC level transmitted to amplifier 90 so that the drum speed decreases.

In summary, the above-described components provide speed control of motor 121 and drum 2 whereby undesired speed variations are automatically corrected and a constant drum speed is attained.

Referring to FIG. 2, when used in connection with the foregoing apparatus, a preferred form of the present invention basically comprises a positioning speed control oscillator 140, a selection control circuit 150, positioning apparatus 182, an unloading control circuit 196, a document clamp drive system 230, a loading control circuit 270, a position logic circuit 302, and an initial condition circuit 316.

Referring to FIG. 3A, positioning speed control oscillator 140 comprises inverters 142–145, a capacitor 146, and a NAND gate 148, all connected as shown.

Figure 3C:
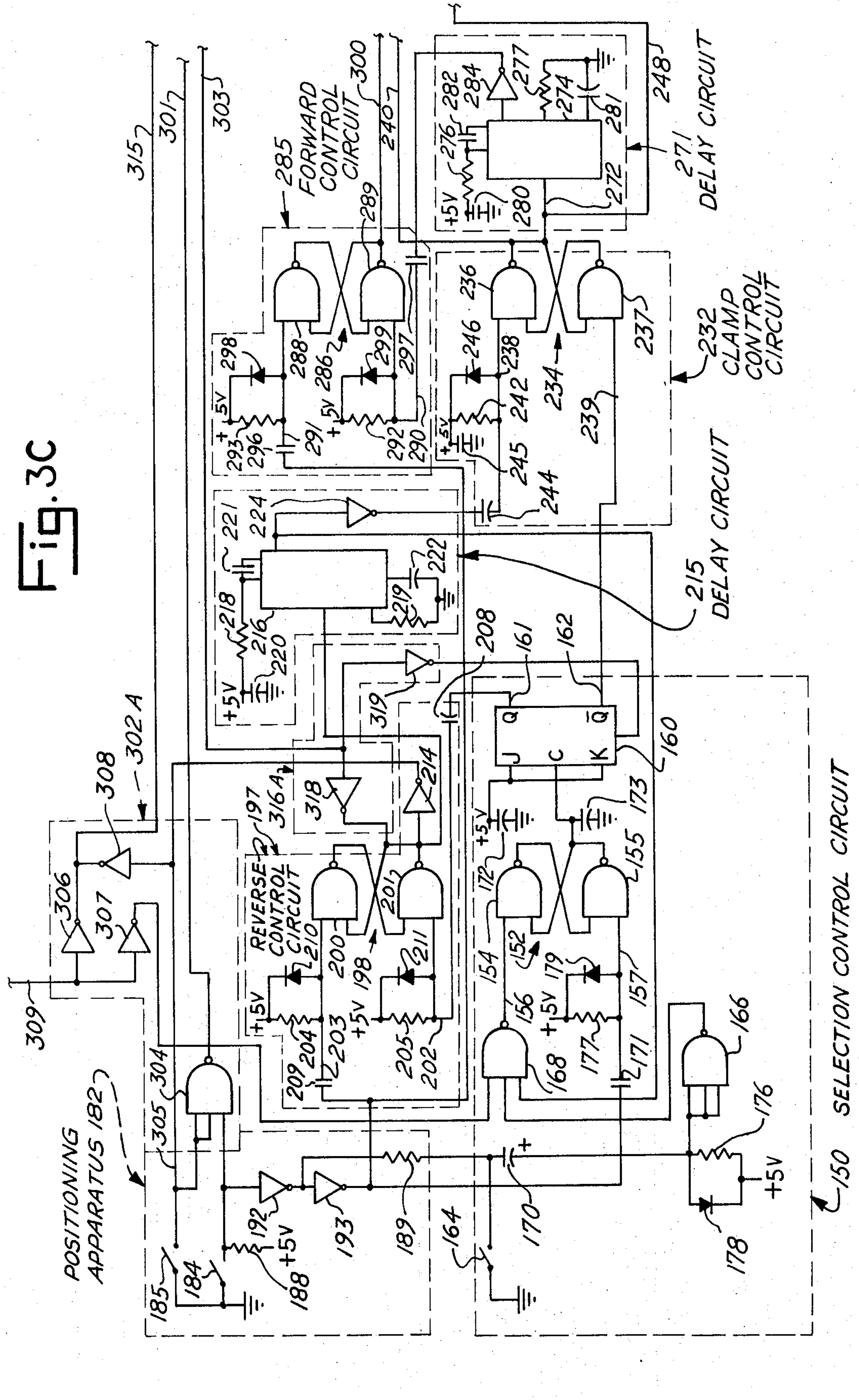

Referring to FIG. 3C, selection control circuit 150 comprises a flip-flop 152 that includes NAND gates 154, 155 having a set input 156 and a reset input 157. Circuit 150 further comprises a J–K flip-flop 160 having an unload output 161 and a load output 162. The flip-flop circuits are operated by operator-controlled switch 164 through an inverting NAND gate 166 and a control NAND gate 168. Circuit 150 also includes capacitors 170–173, resistors 176, 177, and diodes 178, 179. Control NAND gate 168 prevents the initiation of a load or unload cycle of operation while data is being transmitted by the system, or while a cycle of operation is already in progress.

Figure 4:
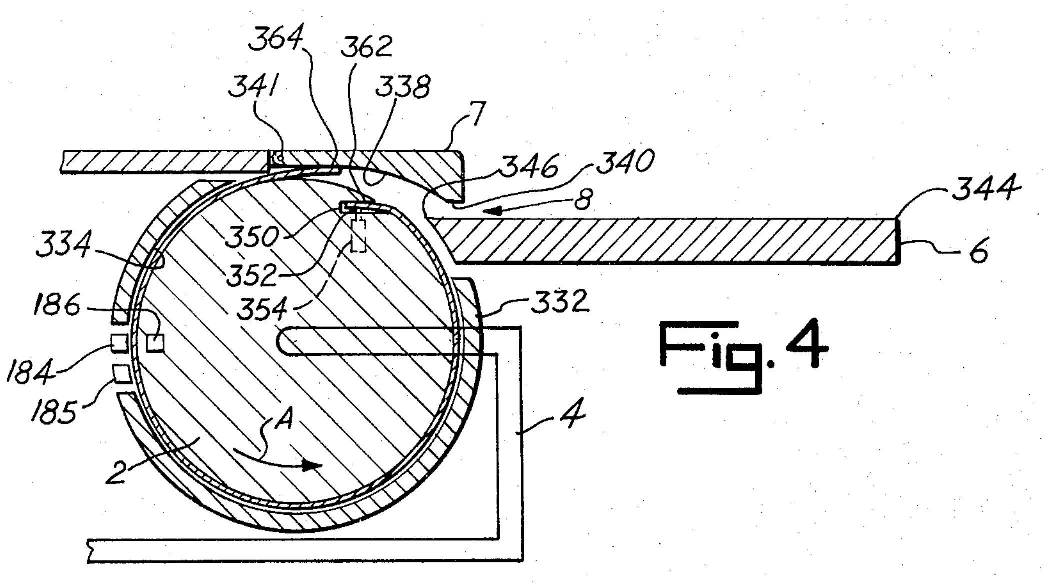
FIG. 4 is an enlarged, fragmentary, cross sectional, schematic drawing of the drum and shroud portion of the system shown in FIG. 1 in its unload position ready to commence the unloading of a document.

Referring to FIGS. 3C and 4, positioning apparatus 182 comprises magnetic reed switches 184, 185 mounted on frame 4 of the system, and a magnet 186 mounted on drum 2 in the position shown. Referring to FIG. 3C, the positioning apparatus further comprises resistors 188, 189 and inverters 192, 193.

Unloading control circuit 196 comprises a reverse control circuit 197 and a delay circuit 215:

Reverse control circuit 197 comprises a flip-flop 198 consisting of NAND gates 200 and 201 which have a set input 202 and a reset input 203. The circuit also comprises resistors 204, 205, capacitors 208, 209, diodes 210, 211, and an inverter 214.

Delay circuit 215 comprises a monostable multivibrator or oneshot circuit 216 that produces a 200–300 millisecond delay signal. The oneshot is controlled by resistors 218, 219 and by capacitors 220–222. The output of the oneshot is transmitted through an inverter 224.

Document clamp drive system 230 comprises a clamp control circuit 232 and a clamp drive circuit 250:

Clamp control circuit 232 comprises a flip-flop 234 consisting of NAND gates 236, 237 having a set input 238 and a reset input 239. The circuit also comprises a resistor 242, capacitors 244, 245 and a diode 246. The output signal from the circuit is transmitted over a conductor 248 to clamp drive circuit 250.

Referring to FIG. 3B, clamp drive circuit 250 comprises amplifying transistors 252, 254 that are controlled by resistors 256–261 and a capacitor 263. The output from transistor 254 is connected to a Darlington transistor pair 265 that drives the paper clamp mechanism through a conductor 266.

Referring to FIG. 3C, loading control circuit 270 comprises a delay circuit 271 and a forward control circuit 285:

Delay circuit 271 comprises an input conductor 272 that is connected to a monostable multivibrator 274 that is identical to circuit 216. The delay circuit also comprises resistors 276, 277, capacitors 280–282, and an inverter 284.

Forward control circuit 285 comprises a flip-flop 286 consisting of NAND gates 288, 289 that have a set input 290 and a reset input 291. The circuit also comprises resistors 292, 293, coupling capacitors 296, 297 and diodes 298, 299. The output of the circuit is transmitted over a conductor 300 to position logic circuit 302.

Position logic circuit 302 comprises circuits 302A and 302B as shown in FIGS. 3C and 3B, respectively. Circuit 302A comprises a NAND gate 304 and inverters 306–308 that are controlled by a run control conductor 309. Circuit 302B comprises inverters 310–314 connected as shown.

Initial condition circuit 316 comprises circuits 316A and 316B as shown in FIGS. 3C and 3B, respectively. Circuit 316A comprises inverters 318, 319 and circuit 316B comprises inverters 322, 324, a resistor 326 and capacitors 328, 329.

Power is supplied to the entire system through a power conductor 330 by a conventional power supply (not shown).

Referring to FIG. 4, the mechanical portions of the loading and unloading system comprise a shroud 332 having an inside surface 334 that urges a document carried by the drum toward the surface of the drum. Access door 7 has an inside surface 338 and a lower edge 340. The door is rotatably mounted on a hinge 341.

Document shelf 6 has an upper surface 344 adapted to support a document. The shelf has an inner edge 346 that terminates radially inward from the inside lower edge 340 of the access door in order to aid the unloading of the document. Edge 340 and upper surface 344 define document opening 8 by which a document may be unloaded or loaded in the system.

Drum 2 comprises a slot 350 adapted to accept a document. The document is held in place by a clamping finger 352 and a bar 354 that are spring-biased in an upward direction. The bar is connected to a solenoid (not shown) that moves the bar and the clamping finger in a downward direction, as shown in FIG. 4, in response to a signal received from clamp drive circuit 250 over conductor 266.

The system is adapted to load and unload a document 360 having a clamped edge 362 held by clamping finger 352 and an unclamped edge 364.

The operation and the method aspect of the preferred embodiment will now be described assuming that document 360 is mounted on drum 2, and that the drum is being rotated at its normal operating speed of 180 RPM during the transmission of data. It will also be assumed that the drum is being rotated in the forward direction (i.e., the direction of arrow A in FIG. 4). When the transmission of data is completed, run control conductor 309 is switched from its 1 to its 0 state by control apparatus not shown. Such apparatus is well known to those skilled in the art. As a result, the divide-by-6 and divide-by-4 circuits 36 and 38 are disabled, and NAND gate 148 is enabled so that slow speed oscillator 140 controls the speed of drum 2 through drum motor drive amplifier 90 and motor 121. When conductor 309 is initially switched to its 0 state, it will be assumed that magnet 186 (FIG. 4) is not located adjacent either of switches 184 and 185. At this time, the inputs to NAND gate 304 are all in their 1 state, so that the output of the NAND gate is switched to its 0 state. This condition switches forward conductor 317 (FIG. 3B) to its 1 state through inverter 312 so that the drum continues to rotate in the forward direction indicated in FIG. 4 at the positioning speed of about 32 RPM depending on the tolerance of the components of slow speed oscillator 140. At the same time, the 1 state condition of conductor 305 is inverted through inverter 308 in order to hold reverse conductor 315 (FIG. 3B) in its 0 state condition so that the motor cannot operate in the reverse direction.

Referring to FIGS. 4 and 3C, when magnet 186 passes adjacent switch 184, the switch closes so that the output of NAND gate 304 is switched to its 1 state and forward conductor 317 is switched to its 0 state through inverter 312 so that the motor stops. In drum 2 overshoots its mark so that magnet 186 comes to rest adjacent switch 185, switch 185 closes and switch 184 opens so that NAND gate 304 is switched to its 0 state in order to prevent the forward motion of the drum, and conductor 305 is switched to its 0 state so that reverse conductor 315 is switched to its 1 state through inverter 308. As a result, the motor reverses the drum until magnet 186 is positioned adjacent switch 184. At that point in time, the condition of switches 184 and 185 is reversed in the above-described manner so that both the forward and reverse conductors 317 and 315, respectively, are held in their 0 states.

Figure 5:
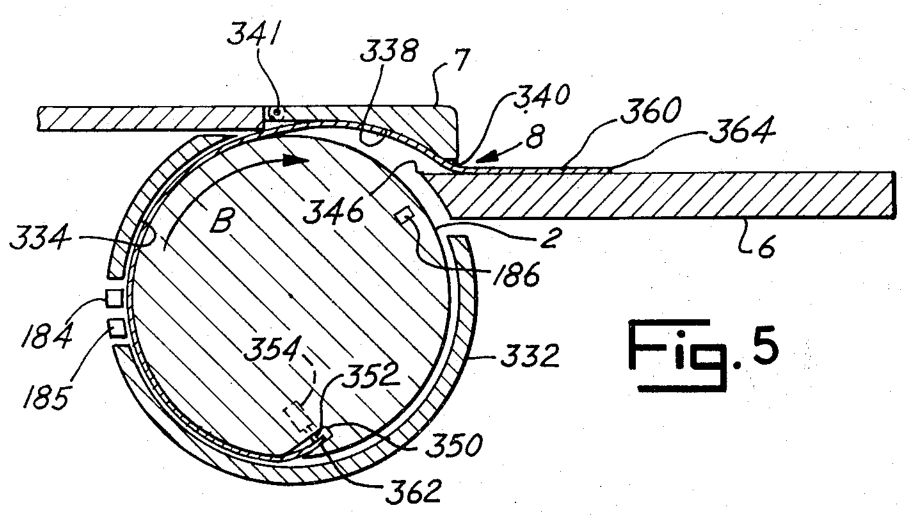
FIG. 5 is a cross sectional drawing of the apparatus shown in FIG. 4 midway through an unload cycle of operation.
Figure 6:
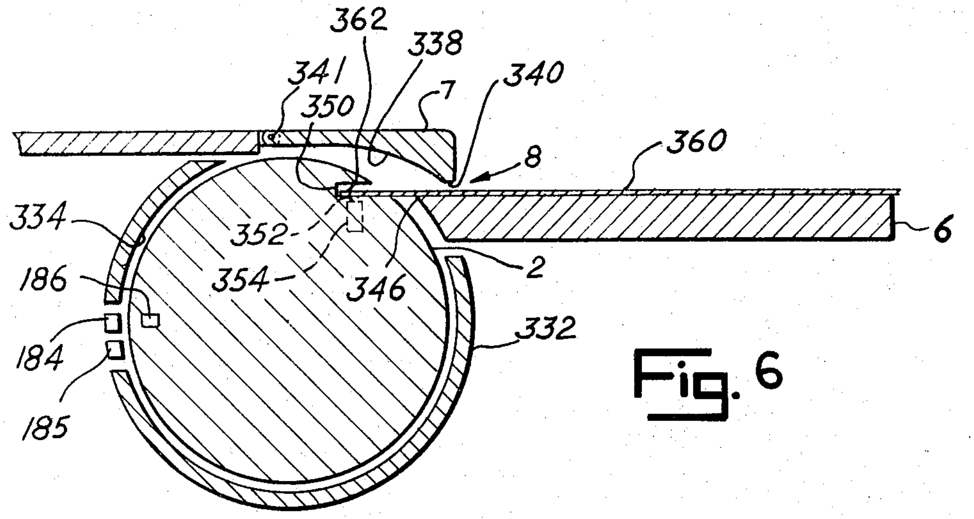
FIG. 6 is a cross sectional drawing of the apparatus shown in FIG. 4 in which the document is unclamped and ready to be withdrawn from the system.

As can be seen in FIG. 4, when the drum is in the illustrated load position, the unclamped edge 364 of document 360 biases itself away from the drum surface. If the operator decides to unload the document, he briefly closes load/unload switch 164 which sets flip-flop 152 and clocks flip-flop 160 so that its Q output is switched from its 1 to its 0 state. This switching transition sets flip-flop 198 in reverse control circuit 197 so that conductor 305 is switched to its 0 state through inverter 214. As a result of this operation, motor 121 drives rotatable drum 116 in the reverse direction at the positioning speed indicated by position speed control oscillator 140 in the manner described above. As the drum is rotated in the reverse direction (i.e., the direction illustrated by arrow B in FIG. 5), the unclamped edge of the paper follows inner surface 338 of access door 7 and is caught by edge 346 of shelf 6 so that it is guided out of document opening 8. After drum 2 has rotated in the reverse direction through one complete revolution, magnet 186 passed adjacent magnetic switch 184 and switch 184 is closed so that the rotation of the drum is stopped in the manner previously described. In addition, as switch 184 is closed, flip-flops 152, 198 and 286 are reset through inverters 192 and 193. As a result, the output terminal of flip-flop 198 is switched from its 1 to its 0 state which triggers oneshot 216. After a 200–300 millisecond delay, flip-flop 234 in clamp control circuit 232 is set by the trailing edge of the output signal from oneshot 216. This switching action produces a positive signal on conductor 248 which is amplified by clamp drive circuit 250 in order to pull clamping bar 354 in a downward direction as shown in FIG. 6. As a result, clamping figure 352 is also moved in a downward direction thereby releasing document 360 for unloading.

In order to load the facsimile system, edge 362 of document 360 is pushed through opening 8 by the operator into slot 350. Then load/unload switch 164 is momentarily closed so that the flip-flop 152 is set and flip-flop 160 is clocked. Since the previously-described operation had switched the $\overline{Q}$ output of flip-flop 160 to its 1 state, the clocking of that flip-flop switches its $\overline{Q}$ output to its 0 state, thereby resetting flip-flop 234. AS a result of this switching, conductor 272 is switched from its 1 to its 0 state which causes clamp drive circuit 250 to release clamping bar 354 and clamping finger 352. The bar and finger are then spring-biased in an upward direction to clamp document 360 to drum 2. At the same time, the transition of the output of flip-flop 234 from its 1 to its 0 state triggers oneshot 274 which sets flip-flop 286 after a 200–300 millisecond delay. As a result, conductor 300 is switched to its 1 state so that forward conductor 317 is switched to its 1 state through inverters 311 and 312. At the same time, reverse conductor 315 is switched to its 0 state through inverter 310. As a result of this switching operation, the drum is rotated in the forward direction at the positioning speed so that the document is automatically drawn around the drum. When the drum is rotated through one complete revolution so that magnet 186 is positioned adjacent magnetic switch 184, the switch closes and the drum stops in the manner described above. In addition, the closure of switch 184 resets flip-flops 152, 198 and 286 so that conductor 300 is switched to its 0 state. This switching action again returns forward conductor 317 to its 0 state through inverters 311 and 312. Since conductor 305 is in its 1 state at this time, reverse conductor 315 is held in its 0 state through inverter 308 so that the drum stops in the position shown in FIG. 4.

As soon as run control conductor 309 is returned to its 1 state, position speed control oscillator 140 is disabled and run speed oscillator 12 is enabled so that the drum rotates in the forward direction at the operating speed. In this manner, documents may be automatically loaded and unloaded with a minimum of operator involvement.

Those skilled in the art will appreciate that the preferred embodiment is merely exemplary of the preferred practice of the invention which may be modified and altered by those skilled in the art without departing from the spirit and scope of the invention.

What is claimed is:

1. In a facsimile system comprising a frame supporting a rotatable member for carrying a document, releasable clamping means for holding the document to the rotatable member, and drive means for rotating the rotatable member in a forward direction at an operating speed and for rotating the rotatable member in a reverse direction, improved apparatus for controlling the drive means in order to operate, load and unload the facsimile system comprising:

speed control means operatively connected to the drive means for rotating the rotatable member at a positioning speed less than the operating speed;

selection means for producing a load signal and for producing an unload signal in response to actuation by an operator of the facsimile system;

cooperating positioning means located on the frame and the rotatable member for producing one or more position signals when the rotatable member and the frame are in one or more predetermined relative positions which facilitate the loading and unloading of a document;

unloading means for enabling the drive means to rotate the rotatable member in the reverse direction at the positioning speed in response to the unload signal and for producing a release signal in response to at least one of the position signals, whereby the document may be automatically fed from the facsimile system;

clamp drive means for releasing the clamping means in response to the release signal whereby the document is released for unloading, and for clamping the clamping means in response to the load signal whereby the document is clamped for loading;

position logic means for disabling the drive means in response to at least one of the position signals so that the clamping means stops at a predetermined load location adjacent an opening in the facsimile system through which a document may be conveniently placed; and loading means for enabling the drive means to rotate the rotatable member in the forward direction at the positioning speed in response to the clamping of a document by the clamping means, whereby the document is automatically fed into the facsimile system.

2. Appartus, as claimed in claim 1, wherein the speed control means comprises an oscillator.

3. Apparatus, as claimed in claim 1, wherein the selection means comprises:

a switch actuatable by the operator;

a first flip-flop circuit comprising an input terminal for receiving a signal from said switch and further comprising an output terminal;

a second flip-flop circuit having an input terminal connected to the output terminal of the first flip-flop circuit and having first and second output terminals for generating the load and unload signals, respectively, whereby the switch can be used to control both loading and unloading of a document.

4. Apparatus, as claimed in claim 1, wherein the unloading means comprises means for stopping the rotatable member at the load location after the rotatable member has been rotated through one revolution in the reverse direction.

5. Apparatus, as claimed in claim 1, wherein the unloading means comprises a flip-flop circuit having a set input operatively connected to the selection means, a reset input operatively connected to the positioning means, a first output terminal operatively connected to the position logic means and a second output terminal operatively connected to the clamp drive means.

6. Apparatus, as claimed in claim 1, wherein the clamp drive means comprises a flip-flop circuit having a set input responsive to the load signal, a reset input responsive to the release signal and an output terminal operatively connected to the clamping means and the loading means.

7. Apparatus, as claimed in claim 1, wherein the loading means comprises means for stopping the rotatable member at the load location after the rotatable member has been rotated through one revolution in the forward direction.

8. Apparatus, as claimed in claim 1, wherein the loading means comprises a flip-flop circuit having a set input operatively connected to the clamp drive means, a reset input operatively connected to the positioning means and an output connected to the position logic means.

9. A method of automatically loading and unloading a document from a facsimile system comprising a rotatable member for rotating the document in a forward direction at an operating speed during data transmission, said method comprising the steps of:

reducing the speed of the rotatable member from the operating speed to a positioning speed less than the operating speed;

stopping the rotatable member at a first position such that the clamped end of the document is adjacent an opening to the facsimile system;

rotating the rotatable member in a reverse direction at the positioning speed so that the document is fed from the facsimile system;

stopping the rotatable member at the first position;

waiting for a predetermined time period after the rotatable member is stopped in the first position;

unclamping the document;

clamping a document to be loaded into the facsimile system; and rotating the rotatable member in the forward direction at the positioning speed so that the document is drawn into the facsimile system.

10. A method of automatically loading and unloading a document from a facsimile system comprising a rotatable member for rotating the document in a forward direction at an operating speed during data transmission, said method comprising the steps of:

reducing the speed of the rotatable member from the operating speed to a positioning speed less than the operating speed;

stopping the rotatable member at a first position such that the clamped end of the document is adjacent an opening to the facsimile system;

rotating the rotatable member in a reverse direction at the positioning speed so that the document is fed from the facsimile system;

stopping the rotatable member at the first position;

unclamping the document;

clamping a document to be loaded into the facsimile system;

waiting for a predetermined time period after the document is clamped; and rotating the rotatable member in the forward direction at the positioning speed so that the document is drawn into the facsimile system.

* * * * *